Patented Mar. 22, 1932

1,850,511

UNITED STATES PATENT OFFICE

FRANK LODGE AND WILLIAM WYNDHAM TATUM, OF MANCHESTER, ENGLAND, ASSIGNORS TO IMPERIAL CHEMICAL INDUSTRIES LIMITED, OF WESTMINSTER, ENGLAND

MANUFACTURE OF ANTHRAQUINONE DERIVATIVES

No Drawing. Application filed September 26, 1929, Serial No. 395,461, and in Great Britain October 2, 1928.

This invention relates to the manufacture of anthraquinone derivatives, and consists in a process for the removal of β-sulphonic acid groups from 1-amino-anthraquinone 2-sulphonic acids by treatment with warm alkaline solution of glucose or other similar polyhydroxylated substance.

It is known that α-sulphonic groups may be removed from sulphonic acids of the naphthalene and anthraquinone series by reducing agents such as sodium amalgam, or nascent electrolytic hydrogen, but β-sulphonic groups resist removal by such methods. The sulphonic groups, α- or β-, in homonuclear substituted anthraquinone sulphonic acids may be removed after reduction to a leuco compound.

We have now made the surprising discovery that a β-sulphonic group in an anthraquinone-β-sulphonic acid, which contains in the α-position ortho to the β-sulphonic group an amino or substituted amino group, is smoothly and completely replaced by hydrogen, without the intermediate production of a leuco-compound, by the action of a warm aqueous alkaline solution of glucose, fructose or other polyhydroxylated body which has similar reducing action.

This is remarkable, since alkaline glucose solution is only a mild reducing agent compared with sodium amalgam, sodium hydrosulphite and other agents previously used for the removal of sulphonic groups. The process is all the more extraordinary in that this reagent does not remove sulphonic groups unless they are ortho to an α-amino or substituted α-amino group; thus 1-amino-4-anilino-anthraquinone-2:8-disulphonic acid is readily converted by hot alkaline glucose solution into 1-amino-4-anilinoanthraquinone-8-sulphonic acid.

Our invention provides a method for the synthesis of various anthraquinone derivatives hitherto difficultly accessible. Thus, starting from 4-bromo-1-aminoanthraquinone-2-sulphonic acid

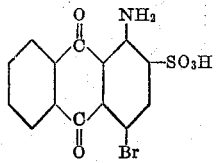

a compound which is easily prepared from α-aminoanthraquinone we may replace the 4-bromine atom by any desired amino or other group unaffected by alkaline glucose solution. The sulphonic group may then be replaced by hydrogen according to our invention by means of alkaline glucose solution. The reactions are smooth and the final products are obtained in excellent yield and in very pure condition.

*Example—Preparation of 1-amino-4-methylaminoanthraquinone*

10 parts of 1-amino-4-methylaminoanthraquinone-2-sulphonic acid (such as may be obtained by warming 1-amino-4-bromoanthraquinone-2-sulphonic acid with aqueous methylamine and a copper salt) are heated to 95° C. with 10 parts of glucose and 600 parts of water, while 20 parts of caustic potash are slowly added. The precipitated violet 1-amino-4-methylaminoanthraquinone is filtered off, washed with hot water and dried. In place of glucose a corresponding quantity of fructose may be taken.

In an analogous manner the sulphonic acid group may be smoothly eliminated from similar compounds such as 1-amino-4-anilino-anthraquinone-2-sulphonic acid, 1-amino-4-p-toluidino anthraquinone-2-sulphonic acid, 1-amino-4-p-amino-anilinoanthraquinone-2-sulphonic acid, 1:4-diaminoanthraquinone-2-sulphonic acid.

By our invention, alpha-aminoanthraquinones may be prepared from sulphonated aminoanthraquinones having beta-sulphonic groups in the ortho position to the alpha amino group; in our process the said sulphonic group is replaced with a hydrogen atom. This replacement of the sulphonic group is effected by means of a mild reducing agent; an aqueous alkaline solution of a polyhydroxylated body having a mild reducing action similar to that of glucose. Glucose and fructose are advantageous. Like compounds having a similar mild reducing action may be used. In our process the reducing agent may be used in at least an amount molecularly equivalent to the anthraquinone compound from which the sulphonic groups are to be removed and replaced by hydrogen.

Our process advantageously converts anthraquinone compounds having the probable structure

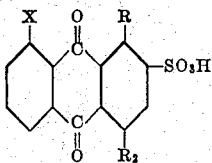

wherein R represents an amino group, $R_2$ represents a group which is unaffected by aqueous alkaline solutions of glucose, and X represents hydrogen or a sulphonic acid group, into alpha-aminoanthraquinone compounds having the probable structure

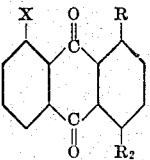

wherein R, $R_2$ and X have the same significance as above. In the above structures, the term amino group is generically used to indicate both the $NH_2$ group and substituted amino groups.

Our process may be applied to anthraquinone compounds having the following structure

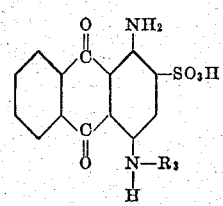

wherein $R_3$ represents hydrogen, an alkyl or aryl group, to replace the sulphonic group in the 2-position with hydrogen, thus giving 1:4-diaminoanthraquinone compounds which are of commercial value. Many of these compounds are important dyestuffs for acetate silk.

Among the many compounds which may be prepared by our process the following are typical:

1-amino-4-anilino-anthraquinone

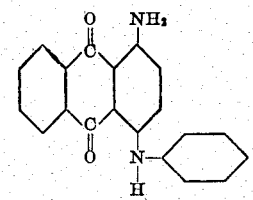

1-amino-4-para-toluidino-anthraquinone

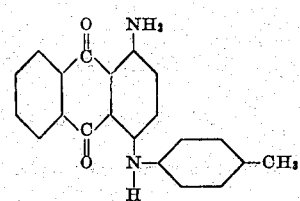

1-amino-4-para-amino-anilino-anthraquinone.

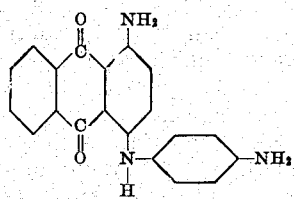

There are many specific modifications of our generic invention, the fundamental reaction of which is the replacement of certain sulphonic acid groups with hydrogen. These sulphonic acid groups are attached to an anthraquinone nucleus in a particular position; first the sulphonic acid group must be in a beta position and second it must also be ortho to an amino group in the alpha position. By our process, all sulphonic acid groups, so attached to an anthraquinone nucleus are replaced with hydrogen.

What we claim and desire to secure by Letters Patent is:—

1. In the manufacture of alpha-aminoanthraquinone compounds from sulphonated alpha-aminoanthraquinone compounds containing a beta-sulphonic acid group ortho to an amino group in the alpha position, the process which comprises reacting such sulphonated alpha aminoanthraquinone compounds with an aqueous alkaline solution of a polyhydroxylated reducing body of the glucose type, thereby replacing said beta-sulphonic acid group by hydrogen.

2. In the manufacture of 1-amino-anthraquinone compounds from 1-aminoanthraquinone-2-sulphonic acid, the process which comprises reacting 1-aminoanthraquinone-2-sulphonic acid compounds with an aqueous alkaline solution of glucose, thereby replacing the sulphonic acid group by hydrogen to give a 1-aminoanthraquinone compound.

3. In the manufacture of anthraquinone compounds having the probable structural formula

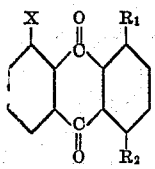

wherein $R_1$ represents an amino group, $R_2$ represents a group which is unaffected by aqueous alkaline glucose solution, and X represents hydrogen or a sulphonic group, the process which comprises reacting an anthraquinone compound having the probable formula

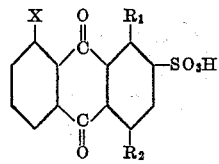

wherein R, $R_2$ and X have the same significance as above, with an aqueous alkaline solution of a polyhydroxylated reducing body of the class consisting of glucose, fructose and compounds having a mild reducing action similar to that of glucose.

4. In the manufacture of anthraquinone compounds having the probable structural formula

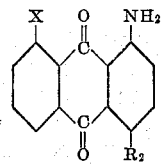

wherein $R_2$ represents an amino, alkyl-amino or aryl-amino group and X represents hydrogen or a sulphonic group, the process which comprises reacting anthraquinone compounds having the probable formula

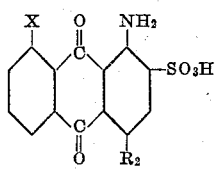

wherein $R_2$ represents an amino, alkyl-amino or aryl-amino group and X represents hydrogen or a sulphonic group, with an aqueous alkaline solution of a polyhydroxylated reducing body of the class consisting of glucose, fructose and like compounds having a mild reducing action similar to that of glucose.

5. The process of claim 4 in which the polyhydroxylated reducing body is glucose.

6. The process of claim 4 in which the polyhydroxylated reducing body is fructose.

7. In the manufacture of anthraquinone compounds having the probable structural formula

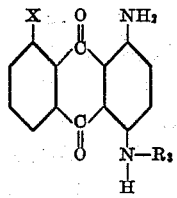

wherein $R_3$ represents hydrogen, methyl, phenyl, tolyl, or amino-phenyl group, and X represents hydrogen or a sulphonic group, the process which comprises reacting anthraquinone compounds having the probable formula

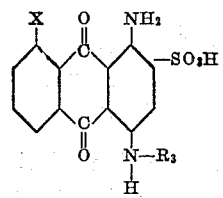

wherein $R_3$ reprensents hydrogen, methyl, phenyl, tolyl or amino-phenyl group and X represents hydrogen or a sulphonic group, with an aqueous alkaline solution of a polyhydroxylated reducing body of the class consisting of glucose, fructose and compounds having a mild reducing action similar to that of glucose.

8. In the manufacture of anthraquinone compounds having the probable structural formula

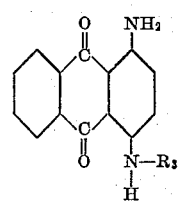

wherein $R_3$ represents hydrogen, an alkyl or aryl group, the process which comprises reacting anthraquinone compounds having the probable formula

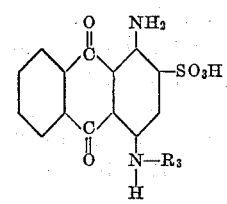

wherein $R_3$ represents hydrogen, an alkyl or aryl group with an aqueous alkaline solution of a polyhydroxylated reducing body of the class consisting of glucose, fructose and compounds having a mild reducing action similar to that of glucose.

9. In the manufacture of an anthraquinone compound having the probable structural formula

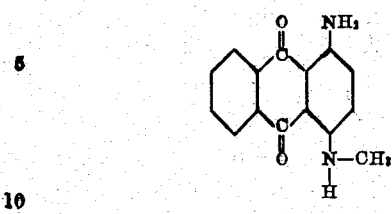

the process which comprises reacting an anthraquinone compound having the probable formula

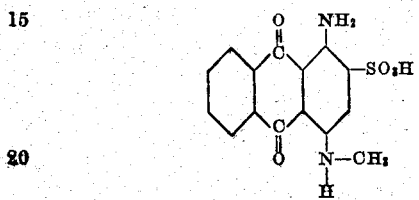

with an aqueous alkaline solution of glucose.

10. In the manufacture of anthraquinone compounds having the probable structural formula

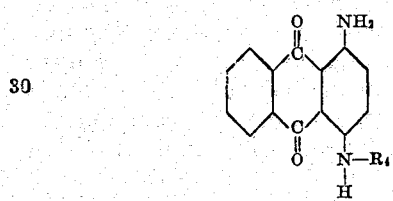

wherein $R_4$ represents an alkyl group, the process which comprises reacting anthraquinone compounds having the probable formula

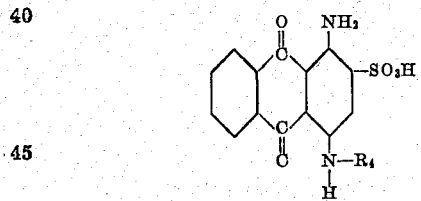

wherein $R_4$ represents an alkyl group with an aqueous alkaline solution of polyhydroxylated reducing body of the class consisting of glucose, fructose and compounds having a mild reducing action similar to that of glucose.

11. In the manufacture of an anthraquinone compound having the probable structural formula

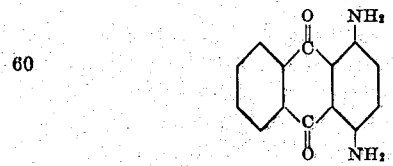

the process which comprises reacting an anthraquinone compound having the probable formula

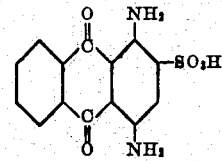

with an aqueous alkaline solution of a polyhydroxylated reducing body of the class consisting of glucose, fructose and compounds having a mild reducing action similar to that of glucose.

12. In the manufacture of anthraquinone compounds having the probable structural formula

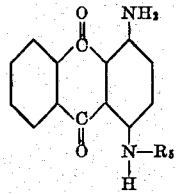

wherein $R_5$ represents a benzene residue, the process which comprises reacting anthraquinone compounds having the probable formula

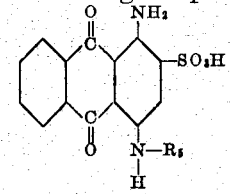

wherein $R_5$ represents a benzene residue with an aqueous alkaline solution of a polyhydroxylated reducing body of the class consisting of glucose, fructose and compounds having a mild reducing action similar to that of glucose.

13. In the manufacture of anthraquinone compounds having the probable structural formula

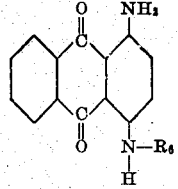

wherein $R_6$ represents a phenyl, tolyl or phenyl-amino group, the process which comprises reacting anthraquinone compounds having the probable formula

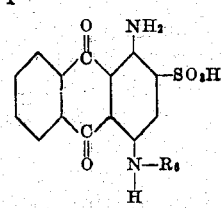

wherein $R_6$ represents a phenyl, tolyl or phenyl-amino group with an aqueous alkaline solution of a polyhydroxylated reducing body of the class consisting of glucose, fructose and compounds having a mild reducing action similar to that of glucose.

14. In the manufacture of 1-amino-4-aminoanthraquinone-2-sulphonic acid compounds having the probable structural formula

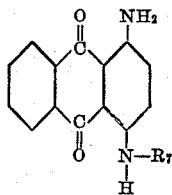

wherein $R_7$ represents an aryl group, the process which comprises reacting a 1-amino-4-aryl-aminoanthraquinone-2-sulphonic acid with an aqueous alkaline solution of glucose, the said aqueous alkaline solution having a mild reducing action, thereby replacing the sulphonic acid group with hydrogen.

15. In the manufacture of 1-amino-4-para-anilinoanthraquinone, the process which comprises reacting 1-amino-4-para-anilino-anthraquinone-2-sulphonic acid, with an aqueous alkaline solution of glucose.

16. In the manufacture of 1-amino-4-para-toluidino-anthraquinone, the process which comprises reacting 1-amino-4-para-toluidino-anthraquinone-2-sulphonic acid with an aqueous alkaline solution of glucose.

17. In the manufacture of 1-amino-4-para-amino-anilino-anthraquinone, the process which comprises reacting 1-amino-4-para-anilinoanthraquinone-2-sulphonic acid with an aqueous alkaline solution of glucose.

In testimony whereof we affix our signatures.

FRANK LODGE.
WILLIAM WYNDHAM TATUM.